(12) United States Patent
Oda et al.

(10) Patent No.: US 10,422,953 B2
(45) Date of Patent: Sep. 24, 2019

(54) OPTICAL MODULE AND INPUTTING METHOD

(71) Applicant: FUJIKURA LTD., Tokyo (JP)

(72) Inventors: Takuya Oda, Chiba (JP); Akira Oka, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/208,134

(22) Filed: Dec. 3, 2018

(65) Prior Publication Data

US 2019/0170939 A1 Jun. 6, 2019

(30) Foreign Application Priority Data

Dec. 4, 2017 (JP) ................. 2017-232641

(51) Int. Cl.
- *G02B 6/126* (2006.01)
- *G02B 6/27* (2006.01)
- *G02B 6/12* (2006.01)
- *G02B 6/24* (2006.01)

(52) U.S. Cl.
CPC ........... *G02B 6/126* (2013.01); *G02B 6/2726* (2013.01); *G02B 6/2766* (2013.01); *G02B 6/241* (2013.01); *G02B 2006/12061* (2013.01)

(58) Field of Classification Search
CPC .......... G02B 6/126; G02B 6/24; G02B 6/241; G02B 6/27; G02B 6/2726; G02B 6/274; G02B 6/2766; G02B 2006/12061

USPC ........ 385/1–3, 11, 31, 49, 50, 123, 129–132
See application file for complete search history.

(56) References Cited

U.S. PATENT DOCUMENTS

2017/0199330 A1* 7/2017 Doany ................... G02B 6/126

OTHER PUBLICATIONS

Toshihiko Baba, "Silicon Micron/Nano-Size Optical Waveguides and Their Device Applications," J. Jpn. Inst. Electron. Packaging, vol. 12, No. 5, p. 458-463, 2009 (6 pages).

* cited by examiner

*Primary Examiner* — Michael P Mooney
(74) *Attorney, Agent, or Firm* — Osha Liang LLP (57) ABSTRACT

An optical module includes: an output section that outputs TM light; and a substrate-type optical waveguide. The substrate-type optical waveguide includes: a waveguide that guides the TM light outputted from the output section; a polarization rotating element that converts the TM light guided through the waveguide into TE light; and a function element that receives the TE light. In the optical module equation $(a \times L) > (b \times L + c)$ is satisfies, where L is a length of the waveguide, a is a propagation loss of the TE light per unit length of the waveguide, b is a propagation loss of the TM light per unit length of the waveguide, and c is an insertion loss by the polarization rotating element.

8 Claims, 4 Drawing Sheets

OPTICAL MODULE AND INPUTTING METHOD

This Nonprovisional application claims priority under 35 U.S.C. § 119 on Patent Application No. 2017-232641 filed in Japan on Dec. 4, 2017, the entire contents of which are hereby incorporated by reference.

TECHNICAL FIELD

The present invention relates to an optical module including a substrate-type optical waveguide. The present invention also relates to a method of inputting light into a function element provided in a substrate-type optical waveguide.

BACKGROUND ART

Substrate-type optical waveguides, in which function elements such as modulation elements and switch elements are provided, are widely used. Typical examples of the substrate-type optical waveguides encompass silicon waveguides (see Non-Patent Literature 1). Such a function element is ordinarily designed to effectively fulfill its function in a case where transverse electric (TE) light is inputted into the function element. This is because (i) TE light allows the power of light, which is to be confined in a core of a substrate-type optical waveguide, to be larger in comparison with the case of transverse magnetic (TM) light and (ii) TE light reacts more acutely to a change in refractive index of a core in comparison with TM light.

CITATION LIST

Non-Patent Literature

[Non-Patent Literature 1]
Toshihiko Baba, "Silicon Photonics", J. Jpn. Inst. Electron. Packaging 12(5), 458-463, 2009

A conventional optical module including a substrate-type optical waveguide is configured so that light, which has been inputted in a function element, is guided as TE light through a core of the substrate-type optical waveguide. However, a side wall of the core of the substrate-type optical waveguide easily becomes rough, and, consequently, there is easily large transmission loss of TE light that reacts acutely to a width of the core. Therefore, in the conventional optical module including the substrate-type optical waveguide, a large amount of light, which is inputted in the substrate-type optical waveguide, may be easily lost before the light reaches the function element. In particular, in a case where a silicon waveguide formed by photolithography and dry etching is used as an optical module, the optical loss becomes remarkable because the size of the core of the silicon waveguide is small in relatively many cases.

SUMMARY

One or more embodiments of the present invention achieve an optical module that allows an amount of light, which is inputted in a substrate-type optical waveguide and is then lost before reaching a function element, to be smaller in comparison with the cases of conventional optical modules.

An optical module in accordance with one or more embodiments of the present invention includes: an output section which outputs TM light; and a substrate-type optical waveguide including (i) a waveguide through which TM light outputted from the output section is guided, (ii) a polarization rotating element which converts, into TE light, the TM light which has been guided through the waveguide, and (iii) a function element into which the TE light is to be inputted, the waveguide having a length L which is set so as to satisfy $a \times L > b \times L + c$ where (i) a is a propagation loss of the TE light per unit length, (ii) b is a propagation loss of the TM light per unit length, and (iii) c is an insertion loss by the polarization rotating element.

An inputting method in accordance with one or more embodiments of the present invention is a method of inputting light into a function element provided in a substrate-type optical waveguide, including: a first inputting step of inputting TM light into the substrate-type optical waveguide; a guiding step of guiding the TM light which has been inputted in the first inputting step, the guiding step being carried out in the substrate-type optical waveguide; a polarization rotating step of converting, into TE light, the TM light which has been guided in the guiding step, the polarization rotating step being carried out in the substrate-type optical waveguide; and a second inputting step of inputting the TE light into the function element, the second inputting step being carried out in the substrate-type optical waveguide, the TM light being guided through a waveguide having a length L which is set so as to satisfy $a \times L > b \times L + c$ where (i) a is a propagation loss of the TE light per unit length, (ii) b is a propagation loss of the TM light per unit length, and (iii) c is an insertion loss in the polarization rotating step.

According to one or more embodiments of the present invention, it is possible to achieve an optical module that includes a substrate-type optical waveguide and allows an amount of light, which is inputted in the substrate-type optical waveguide and is then lost before reaching a function element, to be smaller in comparison with the cases of conventional optical modules.

According to one or more embodiments of the present invention, it is also possible to achieve a method of inputting light into a function element which is provided in a substrate-type optical waveguide, which method allows an amount of light, which is inputted in the substrate-type optical waveguide and is then lost before reaching the function element, to be smaller in comparison with the cases of conventional optical modules.

DETAILED DESCRIPTION (Configuration of Optical Module)

Figure 1A:
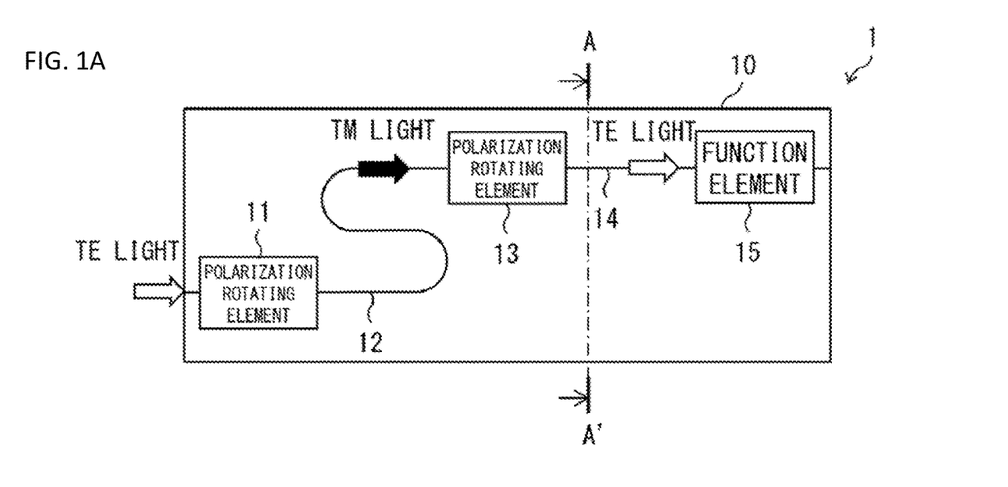
FIG. 1A is a block diagram illustrating a configuration of an optical module in accordance with one or more embodiments of the present invention.
Figure 1B:
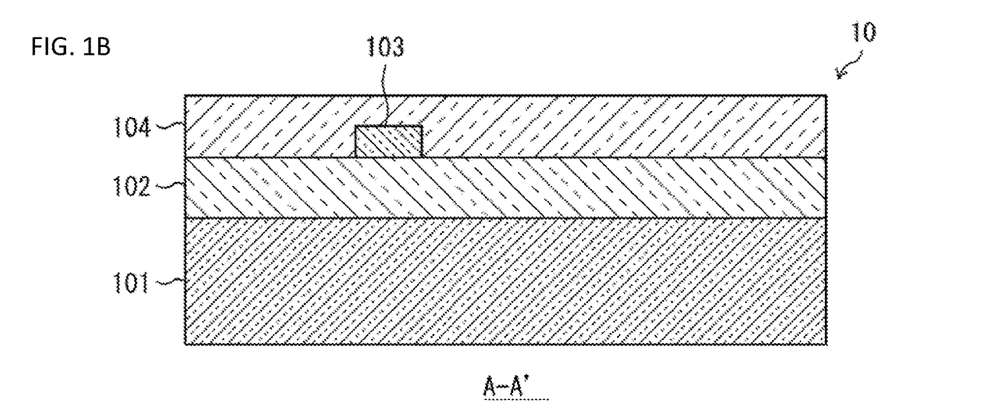
FIG. 1B is a cross-sectional view taken along the A-A' cross section of a substrate-type optical waveguide by which the optical module is configured.

The following description will discuss, with reference to FIGS. 1A and 1B, a configuration of an optical module 1 in accordance with one or more embodiments of the present invention. FIG. 1A is a block diagram illustrating the configuration of the optical module 1. FIG. 1B is a cross-sectional view taken along the A-A' cross section of a substrate-type optical waveguide 10 by which the optical module 1 is configured.

As illustrated in FIG. 1A, the optical module 1 includes (i) a first polarization rotating element 11 (corresponding to "output section" and "another polarization rotating element" in the Claims) provided in the substrate-type optical waveguide 10, (ii) a first waveguide 12 (corresponding to "waveguide" in the Claims) provided in the substrate-type optical waveguide 10, (iii) a second polarization rotating element 13 (corresponding to "polarization rotating element" in the Claims) provided in the substrate-type optical waveguide 10, (iv) a second waveguide 14 provided in the substrate-type optical waveguide 10, and (v) a function element 15 (corresponding to "function element" in the Claims) provided in the substrate-type optical waveguide 10. Into the optical module 1, transverse electric (TE) light is to be inputted. Note that TE light refers to light whose main component is linearly polarized light having an electric field that oscillates parallel to a main surface of the substrate-type optical waveguide 10.

TE light, which has been inputted in the optical module 1, is first inputted in the first polarization rotating element 11. The first polarization rotating element 11 causes a direction of polarization of the TE light, which has been inputted in the optical module 1, to be rotated by 90°. In this way, the first polarization rotating element 11 converts the TE light into transverse magnetic (TM) light. Note that the TM light refers to light whose main component is linearly polarized light having a magnetic field that oscillates parallel to the main surface of the substrate-type optical waveguide 10. In other words, the TM light refers to light whose main component is polarized light having an electric field that oscillates orthogonally to the main surface of the substrate-type optical waveguide 10. The TM light, which has been outputted from the first polarization rotating element 11, is then inputted in the first waveguide 12. The first waveguide 12 guides the TM light from the first polarization rotating element 11. Note that the light outputted from the first polarization rotating element 11 can contain TE light. Note, however, that a polarization extinction ratio of the TM light in the light outputted from the first polarization rotating element 11 is preferably not less than 10 dB and more preferably not less than 20 dB. Note also that the polarization extinction ratio of the TM light refers to a ratio defined by $P_{TM}/P_{TE}$ where (i) $P_{TE}$ is the power of the TE light and (ii) $P_{TM}$ is the power of the TM light.

The TM light, which has been guided through the first waveguide 12, is then inputted in the second polarization rotating element 13. The second polarization rotating element 13 causes a direction of polarization of the TM light, which has been guided through the first waveguide 12, to be rotated by 90°. In this way, the second polarization rotating element 13 converts the TM light into TE light. The TE light, which has been outputted from the second polarization rotating element 13, is then inputted in the second waveguide 14. The second waveguide 14 guides the TE light which has been outputted from the second polarization rotating element 13.

The TE light, which has been guided through the second waveguide 14, is then inputted in the function element 15. In response to receipt of the TE light guided through the second waveguide 14, the function element 15 fulfills its function. The function to be fulfilled by the function element 15 in response to the receipt of the TE light can be any function. Examples of the function element 15 encompass a modulation element, a light receiving element, and a switch element. In a case where the function element 15 is a modulation element, the function element 15 modulates the TE light. In a case where the function element 15 is a light receiving element, the function element 15 converts the TE light into an electric signal. In a case where the function element 15 is a switch element, the function element 15 switches a path of the TE light.

As illustrated in FIG. 1B, the substrate-type optical waveguide 10 includes (1) a substrate 101, (2) a lower cladding layer 102 disposed on the substrate 101, (3) a core 103 provided on the lower cladding layer 102, and (4) an upper cladding layer 104 provided on the lower cladding layer 102 so that the core 103 is buried in the upper cladding layer 104. The core 103 is designed so as to serve as the first polarization rotating element 11, the first waveguide 12, the second polarization rotating element 13, and the second waveguide 14. A method of designing the core 103 to serve as the polarization rotating elements 11 and 13 can be a publicly known method such as the method disclosed in the specification of U.S. Pat. No. 9,529,151.

According to one or more embodiments, the substrate 101 and the core 103 are each made of silicon, and the lower cladding layer 102 and the upper cladding layer 104 are each made of silica. That is, the substrate-type optical waveguide 10 is a silicon waveguide. Note, however, that the material for the substrate 101 and the core 103 is not limited to silicon, provided that the material has a refractive index higher than that of the material for the lower cladding layer 102 and the upper cladding layer 104. Note also that the material for the lower cladding layer 102 and the upper cladding layer 104 is not limited to silica, provided that material has a refractive index lower than that of the material for the substrate 101 and the core 103. That is, the substrate-type optical waveguide 10 can be a substrate-type optical waveguide other than a silicon waveguide.

(Characteristics of Optical Module)

According to a conventional optical module, light which is ultimately inputted in a function element is guided as TE light through a core of a substrate-type optical waveguide. According to the optical module 1 in accordance with one or more embodiments, in contrast, light which is ultimately inputted in the function element 15 is guided as TM light through at least a partial section of the core 103 of the substrate-type optical waveguide 10. Note that the section of the core 103 of the substrate-type optical waveguide 10, through which light to be inputted in the function element 15 is guided as TM light, is a section starting at the first polarization rotating element 11 and ending at the second polarization rotating element 13, that is, a section corresponding to the first waveguide 12.

According to the substrate-type optical waveguide 10 which is a silicon waveguide or the like, an upper wall of the core 103, which upper wall is polished by chemical mechanical polishing (CMP), is less likely to be rough in comparison with side walls of the core 103, which side walls are formed by photolithography and dry etching. Therefore, TM light, which is affected by a height of the core 103 more greatly than by a width of the core 103, has less propagation loss per unit length in comparison with TE light which is affected by the width of the core 103 more greatly than by the height of the core 103. For example, in the core 103 which is designed in a typical manner, the propagation loss of TM light per unit length is approximately 0.1 dB/mm while the propagation loss of TE light per unit length is approximately 0.2 dB/mm. With the optical module 1 in accordance with one or more embodiments, therefore, the amount of light, which is outputted from the first polarization rotating element 11 and is then lost before reaching the function element 15, can be made less in comparison with conventional optical modules. Note that such an effect is a generally obtainable effect in a case where the upper wall of the core 103 becomes rough more easily than do the side walls of the core 103. That is, the method of forming the upper wall and the side walls of the core 103 is not limited to the formation methods described above.

Note that in a case where insertion loss by the second polarization rotating element 13 cannot be ignored, the first waveguide 12 is preferably long enough that the amount, by which transmission loss is decreased because light guided through the first waveguide 12 is changed from TE light to TM light, is greater than the amount by which the transmission loss is increased due to the insertion of the second polarization rotating element 13.

According to the optical module 1 in accordance with one or more embodiments, therefore, the length of the first waveguide 12 is set as follows. Specifically, the length L (unit: mm (for example)) of the first waveguide 12 is set so as to satisfy $a \times L > b \times L + c$ where (i) c (unit: dB (for example)) is an insertion loss by the second polarization rotating element 13, (ii) a (unit: dB/mm (for example)) is a propagation loss of TE light per unit length in the core 103, and (iii) b (unit: dB/mm (for example)) is a propagation loss of TM light per unit length in the core 103. In this way, even in a case where insertion loss by the second polarization rotating element 13 cannot be ignored, the amount, by which transmission loss is decreased because light guided through the first waveguide 12 is changed from TE light to TM light, is greater than the amount by which the transmission loss is increased due to the insertion of the second polarization rotating element 13.

Furthermore, in a case where neither insertion loss by the first polarization rotating element 11 nor insertion loss by the second polarization rotating element 13 can be ignored, the first waveguide 12 is preferably longer so that the amount, by which transmission loss is decreased because light guided through the first waveguide 12 is changed from TE light to TM light, is greater than the amount by which the transmission loss is increased due to the insertion of the first polarization rotating element 11 and the second polarization rotating element 13.

According to the optical module 1 in accordance with one or more embodiments, therefore, the length of the first waveguide 12 is set as follows. Specifically, the length L of the first waveguide 12 is set so as to satisfy $a \times L > b \times L + c' + c$ where c' (unit: dB/mm (for example)) is an insertion loss by the first polarization rotating element 11. In this way, the amount, by which transmission loss is decreased because light guided through the first waveguide 12 is changed from TE light to TM light, is greater than the amount by which the transmission loss is increased due to the insertion of the first polarization rotating element 11 and the second polarization rotating element 13.

(Configuration of Optical Module)

Figure 2A:
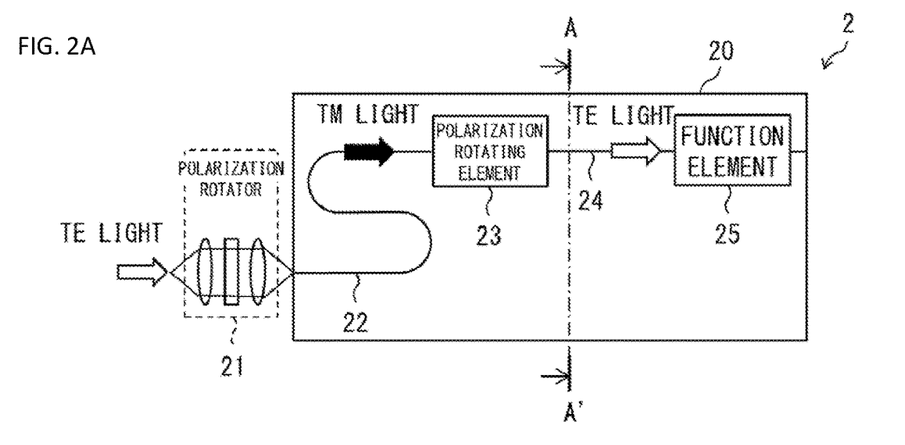
FIG. 2A is a block diagram illustrating a configuration of an optical module in accordance with one or more embodiments of the present invention.
Figure 2B:
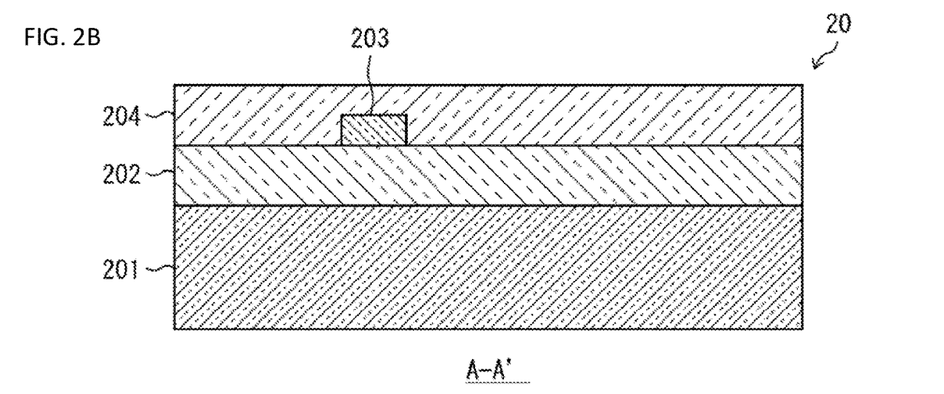
FIG. 2B is a cross-sectional view taken along the A-A' cross section of a substrate-type optical waveguide by which the optical module is configured.

The following description will discuss, with reference to FIGS. 2A and 2B, a configuration of an optical module 2 in accordance with one or more embodiments of the present invention. FIG. 2A is a block diagram illustrating the configuration of the optical module 2. FIG. 2B is a cross-sectional view taken along the A-A' cross section of a substrate-type optical waveguide 20 by which the optical module 2 is configured.

As illustrated in FIG. 2A, the optical module 2 includes (i) a first polarization rotating element 21 (corresponding to "output section" and "another polarization rotating element" in the Claims) provided outside the substrate-type optical waveguide 20, (ii) a first waveguide 22 (corresponding to "waveguide" in the Claims) provided in the substrate-type optical waveguide 20, (iii) a second polarization rotating element 23 (corresponding to "polarization rotating element" in the Claims) provided in the substrate-type optical waveguide 20, (iv) a second waveguide 24 provided in the substrate-type optical waveguide 20, and (v) a function element 25 (corresponding to "function element" in the Claims) provided in the substrate-type optical waveguide 20. Into the optical module 2, transverse electric (TE) light is to be inputted. Note that TE light refers to light whose main component is linearly polarized light having an electric field that oscillates parallel to a main surface of the substrate-type optical waveguide 20.

TE light, which has been inputted in the optical module 2, is first inputted in the first polarization rotating element 21. The first polarization rotating element 21 causes a direction of polarization of the TE light, which has been inputted in the optical module 2, to be rotated by 90°. In this way, the first polarization rotating element 21 converts the TE light into transverse magnetic (TM) light. Note that the TM light refers to light whose main component is linearly polarized light having a magnetic field that oscillates parallel to the main surface of the substrate-type optical waveguide 20. In other words, the TM light refers to light whose main component is polarized light having an electric field that oscillates orthogonally to the main surface of the substrate-type optical waveguide 20. The TM light, which has been outputted from the first polarization rotating element 21, is then inputted in the first waveguide 22. The first waveguide 22 guides the TM light from the first polarization rotating element 21. Note that the light outputted from the first polarization rotating element 21 can contain TE light. Note, however, that a polarization extinction ratio of the TM light in the light outputted from the first polarization rotating element 21 is preferably not less than 10 dB and more preferably not less than 20 dB. According to one or more embodiments, the first polarization rotating element 21 is a polarization rotator configured by a collimating lens 21a, a half-wave plate 21b, and a light-collecting lens 21c which are arranged along an optical path.

The TM light, which has been guided through the first waveguide 22, is then inputted in the second polarization rotating element 23. The second polarization rotating element 23 causes a direction of polarization of the TM light, which has been guided through the first waveguide 22, to be rotated by 90°. In this way, the second polarization rotating element 23 converts the TM light into TE light. The TE light, which has been outputted from the second polarization rotating element 23, is then inputted in the second waveguide 24. The second waveguide 24 guides the TE light which has been outputted from the second polarization rotating element 23.

The TE light, which has been guided through the second waveguide 24, is then inputted in the function element 25. In response to receipt of the TE light guided through the second waveguide 24, the function element 25 fulfills its function. The function to be fulfilled by the function element 25 in response to the receipt of the TE light can be any function. Examples of the function element 25 encompass a modulation element, a light receiving element, and a switch element. In a case where the function element 25 is a modulation element, the function element 25 modulates the TE light. In a case where the function element 25 is a light receiving element, the function element 25 converts the TE light into an electric signal. In a case where the function element 25 is a switch element, the function element 25 switches a path of the TE light.

As illustrated in FIG. 2B, the substrate-type optical waveguide 20 includes (1) a substrate 201, (2) a lower cladding layer 202 disposed on the substrate 201, (3) a core 203 provided on the lower cladding layer 202, and (4) an upper cladding layer 204 provided on the lower cladding layer 202 so that the core 203 is buried in the upper cladding layer 204. The core 203 is designed so as to serve as the first waveguide 22, the second polarization rotating element 23, and the second waveguide 24.

According to one or more embodiments, the substrate 201 and the core 203 are each made of silicon, and the lower cladding layer 202 and the upper cladding layer 204 are each made of silica. That is, the substrate-type optical waveguide 20 is a silicon waveguide. Note, however, that the material for the substrate 201 and the core 203 is not limited to silicon, provided that the material has a refractive index higher than that of the material for the lower cladding layer 202 and the upper cladding layer 204. Note also that the material for the lower cladding layer 202 and the upper cladding layer 204 is not limited to silica, provided that material has a refractive index lower than that of the material for the substrate 201 and the core 203. That is, the substrate-type optical waveguide 20 can be a substrate-type optical waveguide other than a silicon waveguide.

(Characteristics of Optical Module)

According to the optical module 2 in accordance with one or more embodiments, as with the optical module 1 in accordance with one or more embodiments, light which is ultimately inputted in the function element 25 is guided as TM light through at least a partial section of the core 203 of the substrate-type optical waveguide 20. Note that the section of the core 203 of the substrate-type optical waveguide 20, through which light to be inputted in the function element 25 is guided as TM light, is a section starting at an entrance end surface of the substrate-type optical waveguide 20 and ending at the second polarization rotating element 23, that is, a section corresponding to the first waveguide 22. Therefore, as with the optical module 1 in accordance with one or more embodiments, the optical module 2 in accordance with one or more embodiments is configured so that the amount of light, which is outputted from the first polarization rotating element 21 and is then lost before reaching the function element 25, can be made less in comparison with conventional optical modules. Note that such an effect is a generally obtainable effect in a case where the upper wall of the core 203 becomes rough more easily than do the side walls of the core 203. That is, the method of forming the upper wall and the side walls of the core 203 is not limited to the formation methods described above.

Note that in a case where insertion loss by the second polarization rotating element 23 cannot be ignored, the first waveguide 22 is preferably long enough that the amount, by which transmission loss is decreased because light guided through the first waveguide 22 is changed from TE light to TM light, is greater than the amount by which the transmission loss is increased due to the insertion of the second polarization rotating element 23.

According to the optical module 2 in accordance with one or more embodiments, therefore, the length of the first waveguide 22 is set as follows. Specifically, the length L (unit: mm (for example)) of the first waveguide 22 is set so as to satisfy $a \times L > b \times L + c$ where (i) c (unit: dB (for example)) is an insertion loss by the second polarization rotating element 23, (ii) a (unit: dB/mm (for example)) is a propagation loss of TE light per unit length in the core 203, and (iii) b (unit: dB/mm (for example)) is a propagation loss of TM light per unit length in the core 203. In this way, even in a case where insertion loss by the second polarization rotating element 23 cannot be ignored, the amount, by which transmission loss is decreased because light guided through the first waveguide 22 is changed from TE light to TM light, is greater than the amount by which the transmission loss is increased due to the insertion of the second polarization rotating element 23.

Note that in a case where neither insertion loss by the first polarization rotating element 21 nor insertion loss by the second polarization rotating element 23 can be ignored, the first waveguide 22 is preferably longer so that the amount, by which transmission loss is decreased because light guided through the first waveguide 22 is changed from TE light to TM light, is greater than the amount by which the transmission loss is increased due to the insertion of the first polarization rotating element 21 and the second polarization rotating element 23.

According to the optical module 2 in accordance with one or more embodiments, therefore, the length of the first waveguide 22 is set as follows. Specifically, the length L of the first waveguide 22 is set so as to satisfy $a \times L > b \times L + c' + c$ where c' (unit: dB (for example)) is an insertion loss by the first polarization rotating element 21 (i.e. sum of the insertion losses by the collimating lens 21a, the half-wave plate 21b, and the light-collecting lens 21c). In this way, even in a case where neither insertion loss by the first polarization rotating element 21 nor insertion loss by the second polarization rotating element 23 can be ignored, the amount, by which transmission loss is decreased because light guided through the first waveguide 22 is changed from TE light to TM light, is greater than the amount by which the transmission loss is increased due to the insertion of the first polarization rotating element 21 and the second polarization rotating element 23.

(Configuration of Optical Module)

Figure 3A:
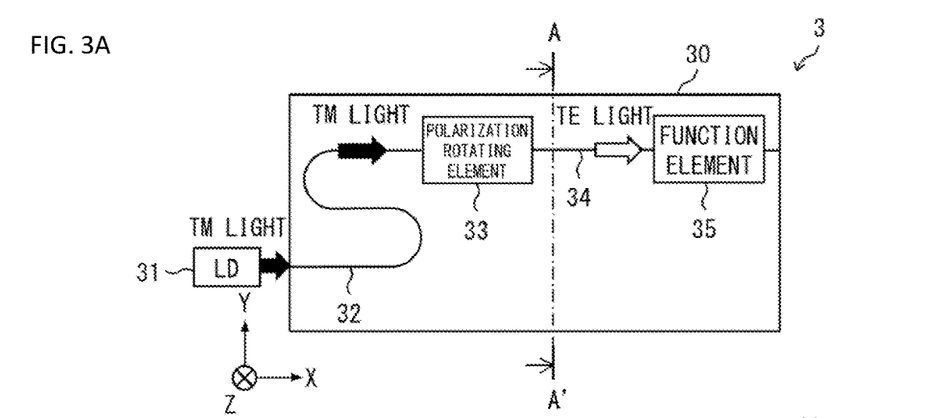
FIG. 3A is a block diagram illustrating a configuration of an optical module in accordance with one or more embodiments of the present invention.
Figure 3B:
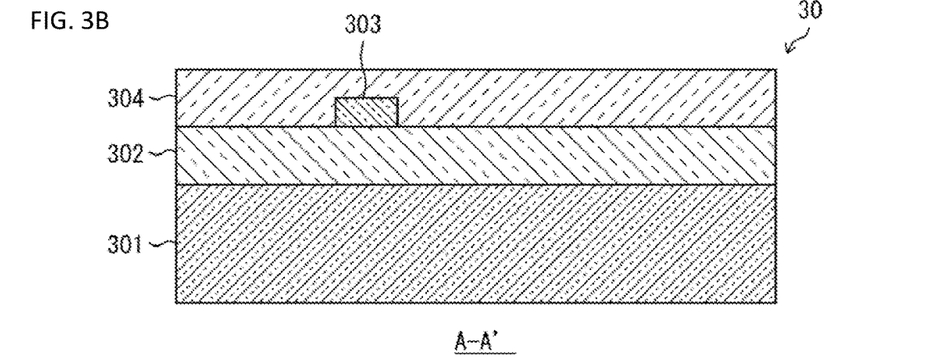
FIG. 3B is a cross-sectional view taken along the A-A' cross section of a substrate-type optical waveguide by which the optical module is configured.
Figure 3C:
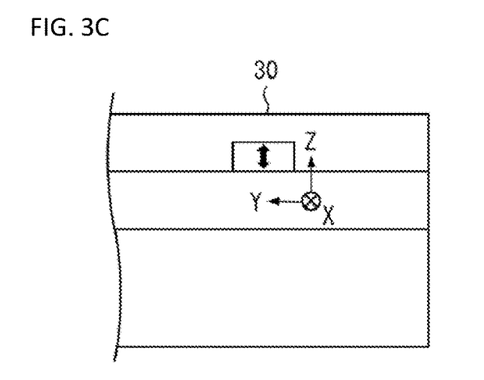
FIG. 3C is a side view illustrating an entrance end surface of the substrate-type optical waveguide by which the optical module is configured.
Figure 3D:
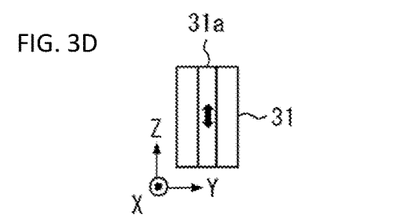
FIGS. 3D and 3E are side views illustrating an emission end surface of a light emitting element by which the optical module is configured.
Figure 3E:
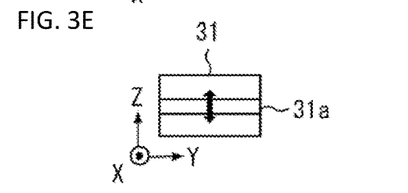

The following description will discuss, with reference to FIGS. 3A-3E, a configuration of an optical module 3 in accordance with one or more embodiments of the present invention. FIG. 3A is a block diagram illustrating the configuration of the optical module 3. FIG. 3B is a cross-sectional view taken along the A-A' cross section of a substrate-type optical waveguide 30 by which the optical module 3 is configured. FIG. 3C is a side view illustrating an entrance end surface of a substrate-type optical waveguide 30 by which the optical module 3 is configured. FIGS. 3D and 3E are side views illustrating an emission end surface of a light emitting element 31 by which the optical module 3 is configured.

As illustrated in FIG. 3A, the optical module 3 includes (i) a light emitting element 31 (corresponding "output section" in the Claims) provided outside the substrate-type optical waveguide 30, (ii) a first waveguide 32 (corresponding to "waveguide" in the Claims) provided in the substrate-type optical waveguide 30, (iii) a polarization rotating element 33 (corresponding to "polarization rotating element" in the Claims) provided in the substrate-type optical waveguide 30, (iv) a second waveguide 34 provided in the substrate-type optical waveguide 30, and (v) a function element 35 (corresponding to "function element" in the Claims) provided in the substrate-type optical waveguide 30.

The light emitting element 31 outputs transverse magnetic (TM) light. Note that the TM light refers to light whose main component is linearly polarized light having a magnetic field that oscillates parallel to the main surface of the substrate-type optical waveguide 30. In other words, the TM light refers to light whose main component is polarized light having an electric field that oscillates orthogonally to the main surface of the substrate-type optical waveguide 30. Note that the light outputted from the light emitting element 31 can contain TE light. Note, however, that a polarization extinction ratio of the TM light in the light outputted from the light emitting element 31 is preferably not less than 10 dB and more preferably not less than 20 dB. According to one or more embodiments, the light emitting element 31 is a laser diode which emits light having an electric field that oscillates parallel to an active layer 31a. In this case, as illustrated in FIG. 3D, the light emitting element 31 is provided so that the active layer 31a is orthogonal to the main surface of the substrate-type optical waveguide 30. Note that the light emitting element 31 can be a laser diode which emits light having an electric field that oscillates perpendicularly to the active layer 31a. In such a case, as illustrated in FIG. 3E, the light emitting element 31 is provided so that the active layer 31a is parallel to the main surface of the substrate-type optical waveguide 30.

The TM light, which has been outputted from the light emitting element 31, is then inputted in the first waveguide 32 via the entrance end surface of the substrate-type optical waveguide 30. The first waveguide 32 guides the TM light which has been outputted from the light emitting element 31. The TM light, which has been guided through the first waveguide 32, is then inputted in the polarization rotating element 33. The polarization rotating element 33 causes a direction of polarization of the TM light, which has been guided through the first waveguide 32, to be rotated by 90°. In this way, the polarization rotating element 33 converts the TM light into transverse electric (TE) light. Note that TE light refers to light whose main component is linearly polarized light having an electric field that oscillates parallel to a main surface of the substrate-type optical waveguide 30. The TE light, which has been outputted from the polarization rotating element 33, is then inputted in the second waveguide 34. The second waveguide 34 guides the TE light which has been outputted from the polarization rotating element 33.

The TE light, which has been guided through the second waveguide 34, is then inputted in the function element 35. In response to receipt of the TE light guided through the second waveguide 34, the function element 35 fulfills its function. The function to be fulfilled by the function element 35 in response to the receipt of the TE light can be any function. Examples of the function element 35 encompass a modulation element, a light receiving element, and a switch element. In a case where the function element 35 is a modulation element, the function element 35 modulates the TE light. In a case where the function element 35 is a light receiving element, the function element 35 converts the TE light into an electric signal. In a case where the function element 35 is a switch element, the function element 35 switches a path of the TE light.

As illustrated in FIG. 3B, the substrate-type optical waveguide 30 includes (1) a substrate 301, (2) a lower cladding layer 302 disposed on the substrate 301, (3) a core 303 provided on the lower cladding layer 302, and (4) an upper cladding layer 304 provided on the lower cladding layer 302 so that the core 303 is buried in the upper cladding layer 304. The core 303 is designed so as to serve as the first waveguide 32, the polarization rotating element 33, and the second waveguide 34.

According to one or more embodiments, the substrate 301 and the core 303 are each made of silicon, and the lower cladding layer 302 and the upper cladding layer 304 are each made of silica. That is, the substrate-type optical waveguide 30 is a silicon waveguide. Note, however, that the material for the substrate 301 and the core 303 is not limited to silicon, provided that the material has a refractive index higher than that of the material for the lower cladding layer 302 and the upper cladding layer 304. Note also that the material for the lower cladding layer 302 and the upper cladding layer 304 is not limited to silica, provided that material has a refractive index lower than that of the material for the substrate 301 and the core 303. That is, the substrate-type optical waveguide 30 can be a substrate-type optical waveguide other than a silicon waveguide.

(Characteristics of Optical Module)

According to the optical module 3 in accordance with one or more embodiments, as with the optical module 1 in accordance with one or more embodiments, light which is ultimately inputted in the function element 35 is guided as TM light through at least a partial section of the core 303 of the substrate-type optical waveguide 30. Note that the section of the core 303 of the substrate-type optical waveguide 30, through which light to be inputted in the function element 35 is guided as TM light, is a section starting at the entrance end surface of the substrate-type optical waveguide 30 and ending at the polarization rotating element 33, that is, a section corresponding to the first waveguide 32. Therefore, as with the optical module 1 in accordance with one or more embodiments, the optical module 3 in accordance with one or more embodiments is configured so that the amount of light, which is outputted from the light emitting element 31 and is then lost before reaching the function element 35, can be made less in comparison with conventional optical modules. Note that such an effect is a generally obtainable effect in a case where the upper wall of the core 303 becomes rough more easily than do the side walls of the core 303. That is, the method of forming the upper wall and the side walls of the core 303 is not limited to the formation methods described above.

Note that in a case where insertion loss by the polarization rotating element 33 cannot be ignored, the first waveguide 32 is preferably long enough that the amount, by which transmission loss is decreased because light guided through the first waveguide 32 is changed from TE light to TM light, is greater than the amount by which the transmission loss is increased due to the insertion of the polarization rotating element 33.

According to the optical module 3 in accordance with one or more embodiments, therefore, the length of the first waveguide 32 is set as follows. Specifically, the length L (unit: mm (for example)) of the first waveguide 32 is set so as to satisfy a×L>b×L+c where (i) c (unit: dB (for example)) is an insertion loss by the polarization rotating element 33, (ii) a (unit: dB/mm (for example)) is a propagation loss of TE light per unit length in the core 303, and (iii) b (unit: dB/mm (for example)) is a propagation loss of TM light per unit length in the core 303. In this way, even in a case where insertion loss by the polarization rotating element 33 cannot be ignored, the amount, by which transmission loss is decreased because light guided through the first waveguide 32 is changed from TE light to TM light, is greater than the amount by which the transmission loss is increased due to the insertion of the polarization rotating element 33.

(Configuration of Optical Module)

Figure 4A:
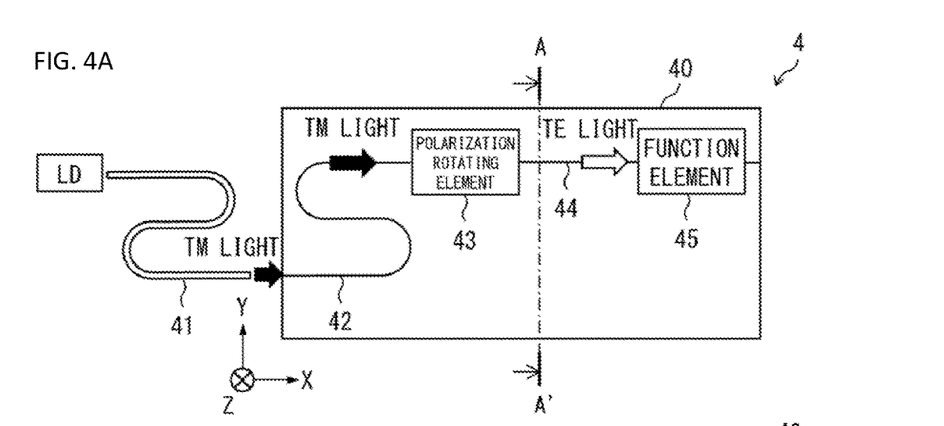
FIG. 4A is a block diagram illustrating a configuration of an optical module in accordance with one or more embodiments of the present invention.
Figure 4B:
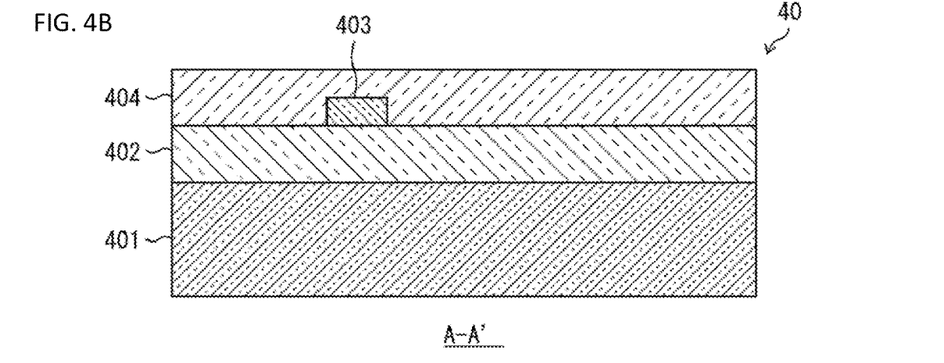
FIG. 4B is a cross-sectional view taken along the A-A' cross section of a substrate-type optical waveguide by which the optical module is configured.
Figure 4C:
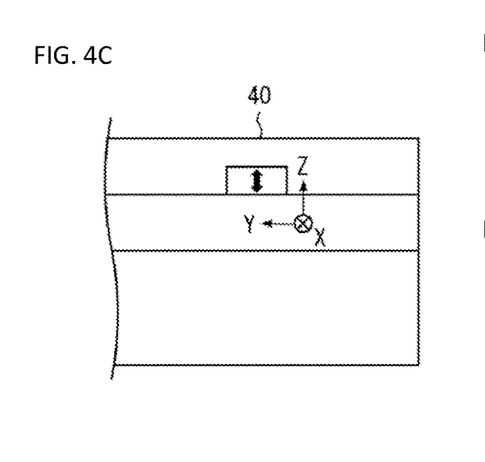
FIG. 4C is a side view illustrating an entrance end surface of the substrate-type optical waveguide by which the optical module is configured.
Figure 4D:
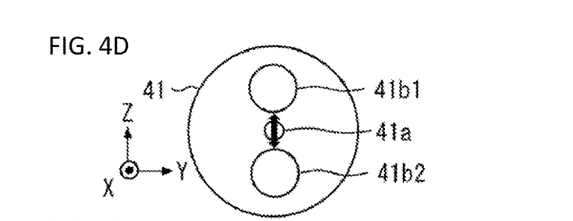
FIGS. 4D and 4E are side views illustrating an emission end surface of a polarization maintaining fiber by which the optical module is configured.
Figure 4E:
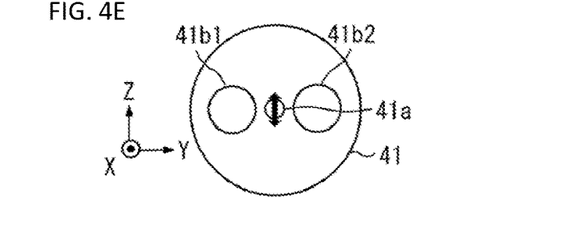

The following description will discuss, with reference to FIGS. 4A-4E, a configuration of an optical module 4 in accordance with one or more embodiments of the present invention. FIG. 4A is a block diagram illustrating the configuration of the optical module 4. FIG. 4B is a cross-sectional view taken along the A-A' cross section of a substrate-type optical waveguide 40 by which the optical module 4 is configured. FIG. 4C is a side view illustrating an entrance end surface of a substrate-type optical waveguide 40 by which the optical module 4 is configured. FIGS. 4D and 4E are side views illustrating an emission end surface of a polarization maintaining fiber 41 by which the optical module 4 is configured.

As illustrated in FIG. 4A, the optical module 4 includes (i) a polarization maintaining fiber 41 (corresponding to "output section" in the Claims) provided outside the substrate-type optical waveguide 40, (ii) a first waveguide 42 (corresponding to "waveguide" in the Claims) provided in the substrate-type optical waveguide 40, (iii) a polarization rotating element 43 (corresponding to "polarization rotating element" in the Claims) provided in the substrate-type optical waveguide 40, (iv) a second waveguide 44 provided in the substrate-type optical waveguide 40, and (v) a function element 45 (corresponding to "function element" in the Claims) provided in the substrate-type optical waveguide 40.

The polarization maintaining fiber 41 outputs transverse magnetic (TM) light. Note that the TM light refers to light whose main component is linearly polarized light having a magnetic field that oscillates parallel to the main surface of the substrate-type optical waveguide 40. In other words, the TM light refers to light whose main component is polarized light having an electric field that oscillates orthogonally to the main surface of the substrate-type optical waveguide 40. Note that the light outputted from the polarization maintaining fiber 41 can contain TE light. Note, however, that a polarization extinction ratio of the TM light in the light outputted from the polarization maintaining fiber 41 is preferably not less than 10 dB and more preferably not less than 20 dB. According to one or more embodiments, the polarization maintaining fiber 41 is a polarization-maintaining and absorption-reducing fiber (PANDA fiber) in which a pair of stress applying parts 41b1 and 41b2 are provided so as to sandwich a core 41a. While linearly polarized light from a light source (not illustrated) is inputted in the polarization maintaining fiber 41, there are following two cases: (1) a case where the linearly polarized light has an electric field that oscillates parallel to a direction in which the stress applying parts 41b1 and 41b2 are arranged and (2) a case where the linearly polarized light has an electric field that oscillates perpendicularly to the direction in which the stress applying parts 41b1 and 41b2 are arranged. In the case (1), the polarization maintaining fiber 41 is provided so that the stress applying parts 41b1 and 41b2 on the emission end surface are arranged in a direction that is orthogonal to the main surface of the substrate-type optical waveguide 40 (see FIG. 4D). Meanwhile, in the case (2), the polarization maintaining fiber 41 is provided so that the stress applying parts 41b1 and 41b2 on the emission end surface are arranged in a direction that is parallel to the main surface of the substrate-type optical waveguide 40 (see FIG. 4E).

The TM light, which has been outputted from the polarization maintaining fiber 41, is then inputted in the first waveguide 42 via the entrance end surface of the substrate-type optical waveguide 40. The first waveguide 42 guides the TM light which has been outputted from the polarization maintaining fiber 41. The TM light, which has been guided through the first waveguide 42, is then inputted in the polarization rotating element 43. The polarization rotating element 43 causes a direction of polarization of the TM light, which has been guided through the first waveguide 42, to be rotated by 90°. In this way, the polarization rotating element 43 converts the TM light into transverse electric (TE) light. Note that TE light refers to light whose main component is linearly polarized light having an electric field that oscillates parallel to the main surface of the substrate-type optical waveguide 40. The TE light, which has been outputted from the polarization rotating element 43, is then inputted in the second waveguide 44. The second waveguide 44 guides the TE light which has been outputted from the polarization rotating element 43.

The TE light, which has been guided through the second waveguide 44, is then inputted in the function element 45. In response to receipt of the TE light guided through the second waveguide 44, the function element 45 fulfills its function. The function to be fulfilled by the function element 45 in response to the receipt of the TE light can be any function. Examples of the function element 45 encompass a modulation element, a light receiving element, and a switch element. In a case where the function element 45 is a modulation element, the function element 45 modulates the TE light. In a case where the function element 45 is a light receiving element, the function element 45 converts the TE light into an electric signal. In a case where the function element 45 is a switch element, the function element 45 switches a path of the TE light.

As illustrated in FIG. 4B, the substrate-type optical waveguide 40 includes (1) a substrate 401, (2) a lower cladding layer 402 disposed on the substrate 401, (3) a core 403 provided on the lower cladding layer 402, and (4) an upper cladding layer 404 provided on the lower cladding layer 402 so that the core 403 is buried in the upper cladding layer 404. The core 403 is designed so as to serve as the first waveguide 42, the polarization rotating element 43, and the second waveguide 44.

According to one or more embodiments, the substrate 401 and the core 403 are each made of silicon, and the lower cladding layer 402 and the upper cladding layer 404 are each made of silica. That is, the substrate-type optical waveguide 40 is a silicon waveguide. Note, however, that the material for the substrate 401 and the core 403 is not limited to silicon, provided that the material has a refractive index higher than that of the material for the lower cladding layer 402 and the upper cladding layer 404. Note also that the material for the lower cladding layer 402 and the upper cladding layer 404 is not limited to silica, provided that material has a refractive index lower than that of the material for the substrate 401 and the core 403. That is, the substrate-type optical waveguide 40 can be a substrate-type optical waveguide other than a silicon waveguide.

According to the optical module 4 in accordance with one or more embodiments, a polarization splitter, which selectively allows TM light to pass therethrough, can be inserted in the vicinity of an entrance end part of the first waveguide 42. This allows the polarization extinction ratio of TM light, which is guided through the first waveguide 42, to remain high even in a case where light outputted from the polarization maintaining fiber 41 contains TE light. Note that a polarization splitter, which can be mounted on a silicon waveguide, is disclosed in literature such as "Hiroshi Fukuda, et. al, 'Ultrasmall polarization splitter based on silicon wire waveguides', OPTICS EXPRESS, Vol 14, No. 25, p 12401-p 12408, Dec. 11, 2006."

(Characteristics of Optical Module)

According to the optical module 4 in accordance with one or more embodiments, as with the optical module 1 in accordance with one or more embodiments, light which is ultimately inputted in the function element 45 is guided as TM light through at least a partial section of the core 403 of the substrate-type optical waveguide 40. Note that the section of the core 403 of the substrate-type optical waveguide 40, through which light to be inputted in the function element 45 is guided as TM light, is a section starting at the entrance end surface of the substrate-type optical waveguide 40 and ending at the polarization rotating element 43, that is, a section corresponding to the first waveguide 42. Therefore, as with the optical module 1 in accordance with one or more embodiments, the optical module 4 in accordance with one or more embodiments is configured so that the amount of light, which is outputted from the polarization maintaining fiber 41 and is then lost before reaching the function element 45, can be made less in comparison with conventional optical modules. Note that such an effect is a generally obtainable effect in a case where the upper wall of the core 403 becomes rough more easily than do the side walls of the core 403. That is, the method of forming the upper wall and the side walls of the core 403 is not limited to the formation methods described above.

Note that in a case where insertion loss by the polarization rotating element 43 cannot be ignored, the first waveguide 42 is preferably long enough that the amount, by which transmission loss is decreased because light guided through the first waveguide 42 is changed from TE light to TM light, is greater than the amount by which the transmission loss is increased due to the insertion of the polarization rotating element 43.

According to the optical module 4 in accordance with one or more embodiments, therefore, the length of the first waveguide 42 is set as follows. Specifically, the length L (unit: mm (for example)) of the first waveguide 42 is set so as to satisfy $a \times L > b \times L + c$ where (i) c (unit: dB (for example)) is an insertion loss by the polarization rotating element 43, (ii) a (unit: dB/mm (for example)) is a propagation loss of TE light per unit length in the core 403, and (iii) b (unit: dB/mm (for example)) is a propagation loss of TM light per unit length in the core 403. In this way, even in a case where insertion loss by the polarization rotating element 43 cannot be ignored, the amount, by which transmission loss is decreased because light guided through the first waveguide 42 is changed from TE light to TM light, is greater than the amount by which the transmission loss is increased due to the insertion of the polarization rotating element 43.

[Recap]

An optical module in accordance with one or more embodiments of the present invention includes: an output section which outputs TM light; and a substrate-type optical waveguide including (i) a waveguide through which TM light outputted from the output section is guided, (ii) a polarization rotating element which converts, into TE light, the TM light which has been guided through the waveguide, and (iii) a function element into which the TE light is to be inputted, the waveguide having a length L which is set so as to satisfy $a \times L > b \times L + c$ where (i) a is a propagation loss of the TE light per unit length, (ii) b is a propagation loss of the TM light per unit length, and (iii) c is an insertion loss by the polarization rotating element.

The optical module in accordance with one or more embodiments of the present invention is preferably configured so that: the output section is another polarization rotating element which converts TE light into TM light; and the length L of the waveguide is set so as to satisfy $a \times L > b \times L + c + c'$ where c' is an insertion loss by the another polarization rotating element.

The optical module in accordance with one or more embodiments of the present invention is preferably configured so that the another polarization rotating element is provided in the substrate-type optical waveguide.

The optical module in accordance with one or more embodiments of the present invention is preferably configured so that the another polarization rotating element is provided outside the substrate-type optical waveguide.

The optical module in accordance with one or more embodiments of the present invention is preferably configured so that the output section is a light emitting element provided outside the substrate-type optical waveguide so as to emit light having an electric field that oscillates orthogonally to a main surface of the substrate-type optical waveguide.

The optical module in accordance with one or more embodiments of the present invention is preferably configured so that the output section is a polarization maintaining fiber provided outside the substrate-type optical waveguide so as to emit light having an electric field that oscillates orthogonally to a main surface of the substrate-type optical waveguide.

The optical module in accordance with one or more embodiments of the present invention is preferably configured so that the function element is a modulation element, a switch element, or a light receiving element.

An inputting method in accordance with one or more embodiments of the present invention is a method of inputting light into a function element provided in a substrate-type optical waveguide, including: a first inputting step of inputting TM light into the substrate-type optical waveguide; a guiding step of guiding the TM light which has been inputted in the first inputting step, the guiding step being carried out in the substrate-type optical waveguide; a polarization rotating step of converting, into TE light, the TM light which has been guided in the guiding step, the polarization rotating step being carried out in the substrate-type optical waveguide; and a second inputting step of inputting the TE light into the function element, the second inputting step being carried out in the substrate-type optical waveguide, the TM light being guided through a waveguide having a length L which is set so as to satisfy $a \times L > b \times L + c$ where (i) a is a propagation loss of the TE light per unit length, (ii) b is a propagation loss of the TM light per unit length, and (iii) c is an insertion loss in the polarization rotating step.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3, 4 Optical module
10, 20, 30, 40 Substrate-type optical waveguide
11, 21 First polarization rotating element
31, 41 Light emitting element, polarization maintaining fiber
12, 22, 32, 42 First waveguide
13, 23 Second polarization rotating element
33, 43 Polarization rotating element
14, 24, 34, 44 Second waveguide
15, 25, 35, 45 Function element

The invention claimed is:

1. An optical module comprising:
an output section that outputs TM light; and
a substrate-type optical waveguide comprising:
  a waveguide that guides the TM light outputted from the output section;
  a polarization rotating element that converts the TM light guided through the waveguide into TE light; and
  a function element that receives the TE light,
wherein formula (1) below is satisfied:

$(a \times L) > (b \times L + c)$, where  (1)

L is a length of the waveguide,
  a is a propagation loss of the TE light per unit length of the waveguide,
  b is a propagation loss of the TM light per unit length of the waveguide, and
  c is an insertion loss by the polarization rotating element.

2. The optical module according to claim 1, wherein the output section is another polarization rotating element that converts the TE light into TM light out putting the output section, and formula (2) below is satisfied:

$(a \times L) > (b \times L + c + c')$,  (2)

where c' is an insertion loss by the output section.

3. The optical module according to claim 2, wherein the output section is disposed in the substrate-type optical waveguide.

4. The optical module according to claim 2, wherein the output section is disposed outside the substrate-type optical waveguide.

5. The optical module according to claim 1, wherein
the output section is a light emitting element disposed outside the substrate-type optical waveguide, and
the output section emits light having an electric field that oscillates orthogonal to a main surface of the substrate-type optical waveguide.

6. The optical module according to claim 1, wherein
the output section is a polarization maintaining fiber disposed outside the substrate-type optical waveguide, and
the output section emits light having an electric field that oscillates orthogonal to a main surface of the substrate-type optical waveguide.

7. The optical module according to claim 1, wherein the function element is a modulator, a switch, or a light receiver.

8. A method of inputting light into a function element disposed in a substrate-type optical waveguide, comprising:
inputting TM light into the substrate-type optical waveguide;
guiding the inputted TM light through a waveguide having a length L disposed in the substrate-type optical waveguide;
converting the TM light guided through the waveguide into TE light in the substrate-type optical waveguide; and
inputting the TE light into the function element disposed in the substrate-type optical waveguide, wherein formula (1) below is satisfied:

$(a \times L) > (b \times L + c)$, where  (1)

a is a propagation loss of the TE light per unit length of the waveguide,
b is a propagation loss of the TM light per unit length of the waveguide, and
c is an insertion loss in the conversion of the TM light into the TE light.

* * * * *